United States Patent Office 3,340,223
Patented Sept. 5, 1967

3,340,223
STORAGE BATTERY
Shunji Shima, Kyoto, Japan, assignor to Nihon Denchi Kabushiki Kaisha, Kyoto, Japan, a company of Japan
No Drawing. Filed Sept. 28, 1965, Ser. No. 491,018
3 Claims. (Cl. 260—41)

ABSTRACT OF THE DISCLOSURE

A molded article formed of polypropylene with a sericite filler.

---

This invention relates to a storage battery having a battery case and a cover thereof made by forming a mixture of polypropylene resin and a fine powder of sericite.

In the past, when battery case and cover were molded of polypropylene, there was such disadvantage that the mold shrinkage was large and the dimensional accuracy of the molding was not satisfactory. This tendency becomes larger especially in the case of large size battery case, and at the time of insertion of the assembly of elements into the battery case the insertion was often difficult. As the above mentioned, it is usual that when molding products in general are taken out of metal mold their dimension shrinks. The ratio of the difference of the dimension of the molding product with respect to the dimension of the metal mold is called mold shrinkage, and it is desirable that the mold shrinkage of the battery case and cover for storage battery is 0.01 cm./cm. or less.

On the other hand, in the case of molding having a complicated structure consisting of a combination large wall thickness portion and small wall thickness portion, stability of molding strength could not be obtained because of the decrease of fluidity, ebb and internal distortion of the material at the time of molding. For example, the mold shrinkage of the conventional product having such complicated structure as the above mentioned is in the range as large as 0.01 to 0.025 cm./cm., but it is preferable that it is 0.01 cm./cm. or less.

According to this invention, by the filling of sericite into polypropylene the thermal conductivity and fluidity at the time of mold are improved, thereby the mold shrinkage even of the product having a complicated structure becomes 0.002 to 0.005 cm./cm. or less, molding having a stable strength can be obtained, and the dimensional accuracy is largely improved.

Furthermore, the adhesiveness of polypropylene in general is small, and in the case of sealing compound used in the battery case and the cover of storage battery its adhesive force is about 0.4 to 1.0 kg./cm.$^2$, but its adhesive force in accordance with this invention is increased up to 1.0 to 2.0 kg./cm.$^2$.

By the way, the adhesive force between the battery case and the cover of storage battery in general is regarded to be practicable if it is 1.0 kg./cm.$^2$ or more.

An example of embodiment of this invention is below

| | Portions (weight) |
|---|---|
| Polypropylene | 100 |
| Filler (Sericite) | 50 |

In this case, it is suitable that the fine powder of sericite is of 100 mesh or less. If it is too coarse, its effect as a filler decreases. As to the mixing proportion of the filler, the range of 5 to 85% in weight is preferable, if it is less than said range the effect of the filler is small, and if it is more than said range the molding becomes difficult to the contrary. In addition, in the case of a mixture within said range, the surface of the particles of the filler is completely covered by the polypropylene resin, and, therefore, the chemical resistance is not decreased at all. The various characteristics of the molding as the above are shown in the following tables.

| Test of Test Piece | Polypropylene (Conventional Product) | Product according to this invention |
|---|---|---|
| Specific Gravity | 0.90 | 1.18 |
| Tensile Strength (kg./cm.$^2$) | 300–400 | 300–400 |
| Expansion (percent) | 250–270 | 9–20 |
| Weatherproofness | Good | Excellent |
| Chemicalproofness | Excellent | Excellent |
| Adhesive Force (kg./cm.$^2$) (according to sealing compound) | 0.4–1.0 | 1.1–2.0 |

| Test of battery case | Polypropylene battery case (Conventional Product) | Battery case in accordance with this invention |
|---|---|---|
| Shockproofness (mm.) | 200–220 | 200–220 |
| Thermal Deformation (mm.) | +3.0 | +1.0 |
| Mold Shrinkage (in./in.) | 0.01–0.025 | 0.002–0.005 |
| Molding Qualities | Good | Excellent |
| Thermal Deformation Temperature (° C.) | 100 | 110 |

REMARKS (1) *Shockproofness.*—A steel ball of 500 g. is dropped onto the center portion of a side wall of a battery case (height 140 mm., width 130 mm., and depth 200 mm.), and the height when said wall is broken.

(2) *Thermal deformation.*—A battery case (depth 200 mm., width 130 mm., and height 140 mm.) is put in a metal frame, it is tightened under the pressure of 200 kg., it is put into a constant temperature tank of 60° C., after keeping as it is for 3 hours said metal frame is removed, the battery case is naturally cooled for 30 minutes, and the amount of deformation in depth direction of the battery case is indicated.

As is shown in the above tables, physical, chemical and mechanical characteristics are improved, and the improvement of dimensional accuracy is especially distinguishable. Furthermore, as the molding qualities become better the manufacturing cost is largely reduced.

What is claimed is:
1. Storage battery having a battery case and a cover therefor which are formed of a mixture of polypropylene resin and finely powdered sericite, the latter within the range of 5 to 85%.
2. A composition for use in molding articles comprising a mixture of polypropylene resin and finely powdered sericite.
3. A composition according to claim 2 wherein said mixture contains about 100 parts by weight of polypropylene and about 50 parts by weight of sericite.

References Cited

UNITED STATES PATENTS 3,157,614   11/1964   Fischer _____ 260—4
3,227,698   1/1966   Robinson _____ 260—94

OTHER REFERENCES

Chemical Abstracts, vol. 60, column 5718h.
Plastics Technology, Effect of Fillers in Polyethylene Warren S. Frissell, November 1956, pages 723–729.

MORRIS LIEBMAN, *Primary Examiner.*

S. L. FOX, *Assistant Examiner.*